Sept. 13, 1955     A. G. COOLEY     2,717,822

PRECISION BELT DRIVE ARRANGEMENTS

Filed Oct. 12, 1950

Inventor
AUSTIN G. COOLEY

By John J. Rogan
Attorney

United States Patent Office 2,717,822
Patented Sept. 13, 1955

2,717,822
PRECISION BELT DRIVE ARRANGEMENTS

Austin G. Cooley, New York, N. Y., assignor to Times Facsimile Corporation, New York, N. Y., a corporation of New York Application October 12, 1950, Serial No. 189,711

6 Claims. (Cl. 346—139)

This invention relates to belt drives, and particularly to driving arrangements for the scanning or analyzing mechanisms of telegraph machines, facsimile machines and recording machines generally.

In certain kinds of mechanisms, of which facsimile machines are typical, it is highly important to be able to transmit power from a driving motor to the driven shaft with the utmost of accuracy so that the rate of linear incremental movement of analyzing device such as a scanning head, recording stylus, or the like, shall be completely uniform throughout every successive scanning traverse, and its motion shall be perfectly linear. For various reasons, ordinary belt and pulley drives, sprocket and chain drives, and the like, are not entirely satisfactory. For example, with ordinary drives there is always present the likelihood of chatter or vibration of the belt, particularly where the belt has a relatively long span between the pulleys. In the case of recording mechanisms this reveals itself as a wavy appearance in the recording of otherwise normal straight lines. More specifically where the original subject matter consists of a number of such straight lines adjacent to each other to be reproduced by facsimile technique, the reproduction on the facsimile machine may have an undesirable pattern resulting from instantaneous variations in the rate of traverse of the scanning head or stylus, or from vibration or chatter of the belt. Similar undesirable results may occur with sprocket and chain drives, or with sprocket and perforated band drives. While conventional belt drives are of utility in certain applications, they have not been found entirely satisfactory in other applications. In the first place, where conventional leather, fabric, rubber, or similar belts have been tried, in order to reduce irregularities and avoid slippage, it was necessary to use grooved or crowned pulleys, since otherwise the belt would creep off a flat-faced pulley. By reason of the groove in the belt face, it is difficult to maintain the belt perfectly flat throughout its longitudinal traverse, since it tends to assume and keep a bowed transverse cross-section. This tendency causes further variations in the driving torque between the driving and driven pulleys, so far as instantaneous incremental speeds are concerned. Because of the very limited anti-fatigue properties of conventional belt materials, after sustained and continuous use, they must be frequently replaced. One of the additional disadvantages of the conventional leather, fabric or rubber belt, is, that if the driving or driven pulleys are not in perfect planar alignment, or if the belt does not have uniform anti-fatigue characteristics throughout its length or cross-section, or does not have uniform thickness, or uniform length or width dimensions, or uniform frictional surface characteristics, it tends to creep or even oscillate laterally with respect to the pulley driving plane or with respect to the plane of the longitudinal traverse. This reveals itself as a transverse oscillation of the belt and of any element carried by the belt during its longitudinal traverse and in the case of recording machines it produces undesirable effects in the reproduced copy.

Furthermore, the use of fabrics or similar belts, subjects the belt to variations in tension and driving friction as a result of moisture, oil, or similar absorption by the belt.

After numerous experiments and extensive research with various forms of power drives, I have discovered that if the highest order of accuracy is required, the belt which conveys the driving power to the stylus, must be of a metal or of an alloy which has a minimum of tension and compression fatigue and which does not deform or take a "set" or change its surface frictional characteristics, its lateral width or thickness, or its hardness, when subjected to continuous use. While the use of metal driving belts has been proposed heretofore, it has been necessary to employ flat-faced pulleys and to maintain the metal belt under very high belt tension, in order that the belt may run true. This also necessitated extreme accuracy of planar alignment of the driving and driven pulleys. If attempts are made to use flat metal belts with the conventional crown or grooved pulleys for example wherein the groove approximates the width of the belt, the very small amount of inherent stretch in these conventional flat metal belts, causes the belt to creep up the sides of the pulley groove. While such arrangements undoubtedly have utility in certain kinds of apparatus where over-all rotational speed is the only object, they are not satisfactory where the exact speed or drive ratio must be accurately maintained for long periods of time and during each minute incremental change of traverse of the belt, and where belt vibration must be at an absolute minimum.

In accordance with the present invention, a belt and pulley arrangement is provided which is peculiarly useful in machines wherein instantaneous accuracy of longitudinal speed or traverse, and absence of belt vibration, are of paramount importance. Merely by way of example, in the case of facsimile machines and the like, the effects of regularly recurrent instantaneous changes in speed or belt vibration, are permanently visible in the reproduced copy. In other systems, such as audible reproducing systems, the effect of instantaneous speed variation is mainly transitory in effect. The belt according to the present invention, will run true on the pulley faces, without danger of distorting its planar shape throughout its entire longitudinal traverse, and will automatically return to its proper aligned position on the pulley face if, for any reason, it should be forced out of normal running position on the pulley face. Furthermore the belt according to this invention, does not require precise planar pulley alignment or extremely high belt tension.

Accordingly, it is one of the principal objects of this invention to provide an improved belt drive wherein instantaneous speed and uniformity of longitudinal traverse is of great importance, and wherein the disadvantages of conventional leather, fabric, rubber or flat metal belts, are avoided.

A feature of the invention relates to a metal belt having a flat outer surface and a pulley-engaging under-surface which has an accurately formed groove for insuring instantaneous accuracy of drive power transmission and of freedom from fatigue, and belt chatter.

Another feature relates to a metal belt which has a flat outer surface and an accurately longitudinally grooved under-surface, which registers with a corresponding rib on the cooperating pulley.

A further feature relates to the novel combination of elements which cooperate to provide an improved belt drive for precision work.

Other features and advantages not particularly enumerated, will become apparent after a consideration of the following detailed descriptions and the appended claims.

While the invention will be illustrated herein as applied to a facsimile recording machine of the continuously moving sheet or web type, it will be understood that such is merely for explanatory purposes. Consequently, certain features of the invention can be embodied in any mechanism wherein precision of power transmission or traversing movement of an element is required.

Figure 1:
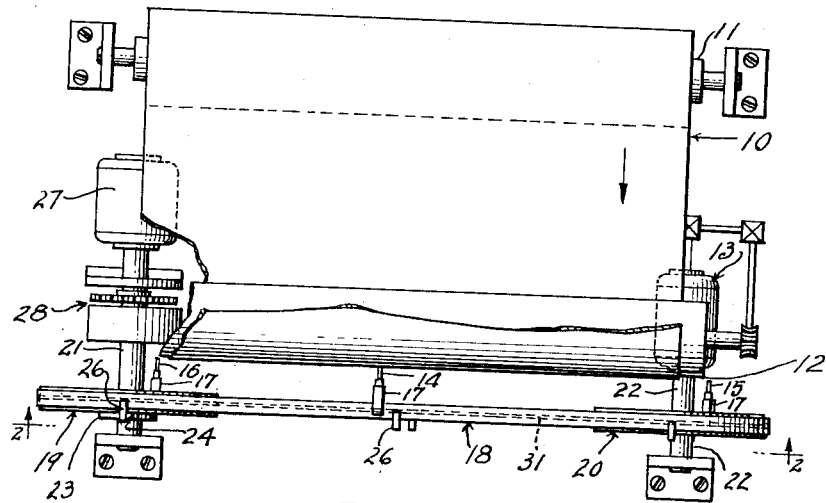
Fig. 1 represents a schematic top plan view of the pertinent parts of a facsimile machine of the continuous recording type embodying features of the invention.

Referring to Fig. 1, there is shown a sheet or web 10 upon which intelligence is to be recorded, for example by conventional electric facsimile techniques. The web 10 is paid-off from a suitable supply or pay-off reel 11, and passes around a rotating platen or drum 12 which is driven for example by a motor 13 so as to feed the sheet 10 in the direction of the arrow at the required speed, the sheet being received on a receiving reel or roll (not shown). By any well-known pressure means (not shown), the sheet 10 can be smoothly pressed around the periphery of platen 12 at the recording area. The sheet 10 is scanned or analyzed in successive dot areas along each successive transverse linear element extending across the width of the sheet. Merely for explanation, it will be assumed that the machine is a facsimile recording machine and that the reproduction is effected by means of a series of recording styluses 14–16 each of which is required successively to traverse the width of the sheet 10 in a perfectly straight line motion and without chattering or vibration. When one stylus has thus scanned a linear element on sheet 10, the latter is fed in the direction of the arrow, an elemental distance, so that on the next longitudinal traverse by the next stylus, the next succeeding linear element of the sheet 10 is scanned in successive elemental dots, for example each dot being usually about 0.01 inch square, or more than 100 dots per inch. It will be understood that the sheet 10 is of any well-known electrosensitive kind, which responds to the electrical energization of stylus 14 to effect a corresponding marking of the sheet at the respective elemental areas thereof representing the lights and shades of the original subject matter to be recorded. By varying the intensity of the excitation of the stylus 14, the blackness, size, or other similar optical reproduction effect, may be produced at the successive dot areas of the recording sheet 10. In effect, therefore, each recorded transverse elemental line of sheet 10 may be considered as made up of a series of minute successive dots. It is highly important therefore that each stylus always traverse from one dot area to the next at a uniform rate, and that its traversing movement be confined to a perfectly straight line. In other words, the stylus must not be subject to any variations of speed in a direction along each transverse linear element of sheet 10, and should not vibrate in a direction perpendicular to such transverse linear element.

It will be understood, of course, that the invention is not limited to the use of a plurality of styluses or scanning heads. Preferably, and as shown in the drawing, a series of such styluses 14, 15, 16, are longitudinally spaced apart a distance just slightly greater than the width of the sheet 10, as that the instant one stylus leaves the right-hand edge of the sheet after completing the scanning of one linear element, the next stylus engages the left-hand edge to begin the scanning of the next linear element, and so on for each of the successive styluses which therefore become cyclically effective in recording the various linear elements. Each of the styluses is mounted in a suitable stylus holder 17 attached to the composite drive belt and carrier 18.

Figure 2:
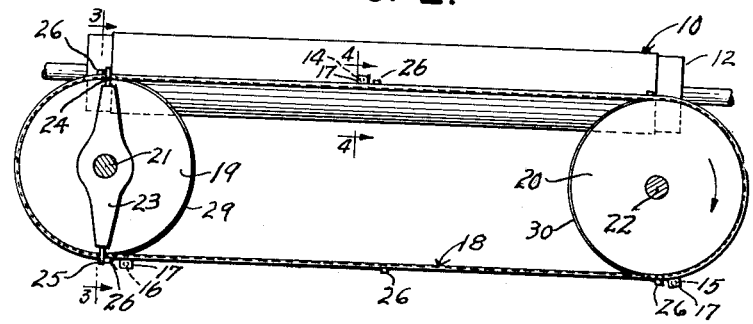
Fig. 2 is a front view of Fig. 1.
Figure 4:
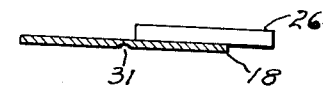
Fig. 4 is a magnified cross-sectional view of the metal tape drive according to the invention, and taken along the line 4—4 of Fig. 2.

In accordance with the invention, the composite belt and carrier 18 consists of a band or strip of metal which has sufficient strength and good anti-fatigue properties. While Fig. 4 shows the belt in magnified cross-section, one belt that was found satisfactory had a thickness of the order of a few mils, and a width of 5/16 inch, and the wheels 19, 20, were of 12-inch diameter. I have found that this strip member should be made of a strong elastic metal, such as stainless steel or beryllium-copper alloy, or Phosphor bronze, with the ends of the strip butt-welded to form a smoothly continuous flat belt. If desired, the strip may be formed from a one-piece endless collar or ring of metal which is rolled out to the desired dimensions. In any event, the metal or alloy that is used, should be such as to be free from substantial embrittlement or hardening in the process of manufacture or as a result of continued use in the machine. The driving surface of the strip or belt 18 is adapted to engage a pair of wheels 19, 20, which are mounted in respective suitable bearings. Wheel 19 is freely rotatable on shaft 21, while wheel 20 is keyed or otherwise fastened to shaft 22 which is driven by the motor 13 in the direction of the arrow (Fig. 2). The shaft 21 has keyed thereto, adjacent one side of the idler wheel 19, a synchronizing arm 23, which arm has diametrically-opposite teeth 24, 25, adapted to engage successive and respective pairs of lugs 26 affixed to belt 18. These lugs extend outwardly from one edge of the belt so as to be engaged by the teeth 24, 25. The shaft 21 is arranged to drive the arm 23 in the same direction as wheel 20 at a predetermined synchronous speed by means of a suitable synchronous motor 27 through an intervening phasing mechanism 28, which may be of the type described in United States Letters Patent No. 2,492,621. The spacing of each successive pair of lugs 26 on the belt 18 is so related to the diameter of the wheel 19 and the length of the arm 23, so that as one tooth, for example tooth 24, is in contact with a lug 26, the opposite tooth 25 is just slightly spaced from the corresponding lug 26. The belt 18 is frictionally driven by the wheel 20 at a slightly higher speed than the synchronous rotational speed of arm 23, as described and claimed in my co-pending application for United States Letters Patent, Serial No. 121,180, filed October 13, 1949, (issued as Patent No. 2,643,174 on June 23, 1953). As explained in said prior application Serial No. 121,180, the synchronous motor 27, through the intermediary of the arm 23 and the cooperating lugs 26, will hold back the movement of the belt 18 to synchronous speed, it being understood that the motor 13 which drives the wheel 20 is of a variable speed type, and is designed to run normally at slightly higher speed than the synchronous motor 27.

Figure 3:
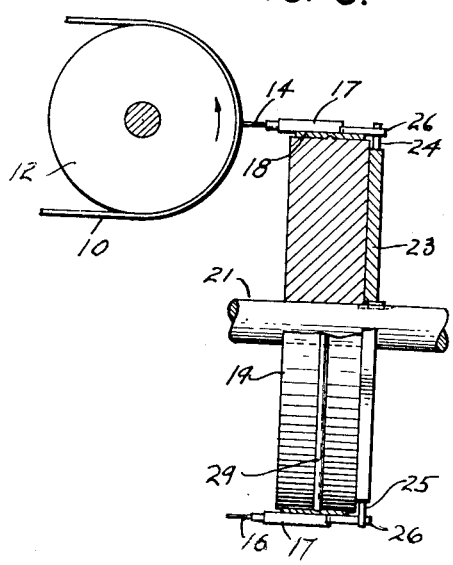
Fig. 3 is a sectional view of Fig. 2, taken along the line 3—3 thereof.

Each of the wheels 19, 20, is provided centrally of its flat peripheral face with a raised rib 29, 30. The wheel-engaging or under-surface of the flat metal strip 18, as shown in Figs. 3 and 4, is provided with a central continuous groove or recess 31, preferably of rounded contour and of uniform dimensions throughout the length of the belt, and corresponding more or less to the contour of the respective ribs 29, 30. The depth of groove 31 may be from about one-tenth to nine-tenths of the belt thickness. Preferably, the clearance between the wall of the groove 31 and the surface of the ribs, should be an absolute minimum consistent with free registry therebetween. I have found that the wheels themselves may be out of planar alignment to a substantial extent without the metal strip 18 running off the wheels.

Figure 5:
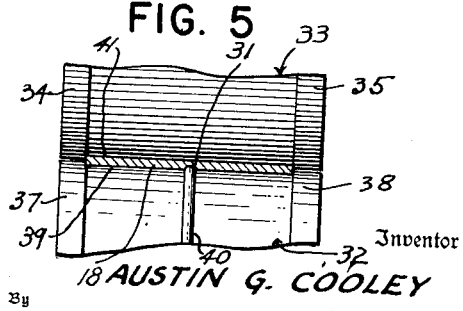
Fig. 5 illustrates part of a mechanism for forming the grooved metal tape according to the invention.

In order to provide the belt with the required characteristics, it is advisable that it be formed by rolling the groove 31 into the face of the metal belt. For example as shown in Fig. 5, the endless belt 18 can be passed between two pressure rollers 32, 33. The roller 33 is undercut so as to have two lateral flanges 34, 35. Likewise the roller 32 is undercut to have two lateral flanges 37, 38. The undercut portion 39 of the roller 32 has a central raised rib 40 of the required height and contour, whereas the undercut portion 41 of the roller 33 is unribbed. The combined depth of the undercut portions 39, 41, is less than the thickness of the member 18, so that when the rollers are pressed together with the strip between them, the flat upper surface of the strip 18 is backed against the unribbed portion 41 of roller 33. Consequently the rib 40 forms the groove 31 without any distortion of the upper face of the strip 18. If any such distortion occurred, it would undesirably stiffen the belt longitudinally. During the initial rolling stages, the belt 18 increases in width so that it may be necessary to make the spacing between flanges 34—35 and 37—38 adjustable to accommodate the increase in belt width. Or if desired, the belt may be passed through successive roller stages having flanges of increased spacing in the successive stages and with undercut portions for the successive stages of corresponding decreased depth.

While one particular embodiment of the invention has been illustrated and described, it will be understood that certain features of the invention are capable of application to any device or mechanism wherein a high degree of accuracy of movement is required using a pulley and belt drive, and various changes and modifications may be made in the disclosed embodiment without departing from the spirit and scope of the invention. For example, while the specification has described the formation of the groove in the endless band by means of a rolling operation, it will be understood that this groove can be formed by any other well-known process, e. g. by a cutting or a grinding operation, providing this cutting or grinding operation does not distort the upper flat face of the belt to any extent which would stiffen the belt longitudinally.

What is claimed is:

1. In a precision instrument of the kind having an element which is to be moved cyclically over an identical linear path extending across a surface to be scanned, the combination of an endless metal band to which said element is attached, said band having substantially negligible permanent elongation when subjected to a continuous tension during said scanning movement, at least one peripheral flat faced wheel around which said band is tautly and frictionally held, and means to maintain said band in substantial fixed lateral relation to said flat peripheral face during continuous rotation of said wheel, the last-mentioned means including a peripheral rib on the flat face of said wheel, and a corresponding continuous recess in the wheel-engaging face of said band.

2. A precision instrument according to claim 1, in which said metal band has a thickness of the order of a few mils and said recess is formed to a depth of approximately one-tenth to nine-tenths of the belt thickness.

3. A precision instrument according to claim 2, in which a pair of similar peripheral flat faced wheels are provided and around which said belt is tautly held, each wheel having a similar raised rib registering with said belt recess.

4. A precision instrument according to claim 2, in which said rib is located substantially centrally of the flat peripheral face on said wheel, and said recess is located substantially centrally of said band.

5. A precision instrument according to claim 4, in which said band is maintained taut around said wheels and is free from separate belt tensioning and guiding means apart from said ribs and said belt recess.

6. In a facsimile machine the combination of an endless metal band carrying a scanning element for traversing a cyclically repeated identical linear path across the surface to be scanned, a pair of peripherally flat faced wheels around which said band is tautly held for driving relation, said band having a lateral projection adapted to be mechanically engaged by a rotatable synchronizing element, said engagement tending to push said band off said wheels and means to maintain said band in fixed lateral relation to said wheels during continuous rotation thereof, the last-mentioned means including a peripheral rib on the flat face of each wheel and a corresponding continuous recess in the wheel engaging face of said band and registering with the rib on each wheel.

References Cited in the file of this patent

UNITED STATES PATENTS

| Number | Name | Date |
| --- | --- | --- |
| 207,626 | Sargent | Sept. 3, 1878 |
| 2,133,181 | Allen | Oct. 11, 1938 |
| 2,278,919 | Erickson et al. | Apr. 7, 1942 |
| 2,384,515 | Wise | Sept. 11, 1945 |
| 2,429,119 | Bloomfield | Oct. 14, 1947 |
| 2,613,124 | Cooley et al. | Oct. 7, 1952 |